United States Patent [19]
Krivec

[11] Patent Number: 5,335,418
[45] Date of Patent: Aug. 9, 1994

[54] PIVOTAL HAND TOOL WITH FLEXURAL PIVOT JOINT AND METHOD OF ASSEMBLING SAME

[75] Inventor: Bert Krivec, Waukesha, Wis.

[73] Assignee: Snap-on Tools Corporation, Kenosha, Wis.

[21] Appl. No.: 3,783

[22] Filed: Jan. 13, 1993

Related U.S. Application Data

[63] Continuation-in-part of Ser. No. 833,944, Feb. 10, 1992, abandoned.

[51] Int. Cl.$^5$ .............. B26B 13/28; B23K 31/02; F16D 1/00
[52] U.S. Cl. ........................ 30/266; 228/189; 403/291
[58] Field of Search .............. 30/254, 266; 29/436, 29/173; 228/189; 411/152, 160, 531; 403/291

[56] References Cited

U.S. PATENT DOCUMENTS

| | | |
|---|---|---|
| 2,931,092 | 4/1960 | Humphrey . |
| 3,277,555 | 11/1966 | Kutash . |
| 3,324,960 | 6/1967 | Bauer et al. . |
| 3,559,515 | 2/1971 | Kyser . |
| 3,602,074 | 8/1971 | Smith .................. 30/266 |
| 3,680,212 | 8/1972 | Rozmus . |
| 3,807,029 | 4/1974 | Trodger ................ 29/436 |
| 4,195,542 | 4/1980 | Zimmer ................ 411/531 |
| 4,218,821 | 8/1980 | Schneider ............... 30/254 |
| 4,405,184 | 9/1983 | Bahiman . |
| 4,531,520 | 7/1985 | Reggers et al. . |
| 4,536,958 | 8/1985 | Tosi . |
| 4,655,629 | 4/1987 | Flaherty ................ 403/291 |
| 4,812,072 | 3/1989 | Brooks ................. 403/291 |
| 4,997,123 | 3/1991 | Backus et al. . |

OTHER PUBLICATIONS

Snap-on Corporation drawing of Displacement Indicator Device.

*Primary Examiner*—Richard K. Seidel
*Assistant Examiner*—Paul M. Heyrana, Sr.
*Attorney, Agent, or Firm*—Emrich & Dithmar

[57] ABSTRACT

A hand tool includes first and second lever members which intersect and have aligned openings therethrough in which is received a flexural pivot assembly, including a pair of cylindrical members respectively disposed in the lever member openings and respectively fixed to the lever members for movement therewith. In one embodiment the cylindrical members of the pivot assembly are press fitted directly in the openings of the lever members. In another embodiment, bushings are press-fitted in the openings between the lever members and the cylindrical members. A spacer is disposed between the cylindrical members to prevent their axial movement toward each other, and the spacer may extend between the lever members and has a very low coefficient friction so as not to impede pivotal movement of the levers.

19 Claims, 3 Drawing Sheets

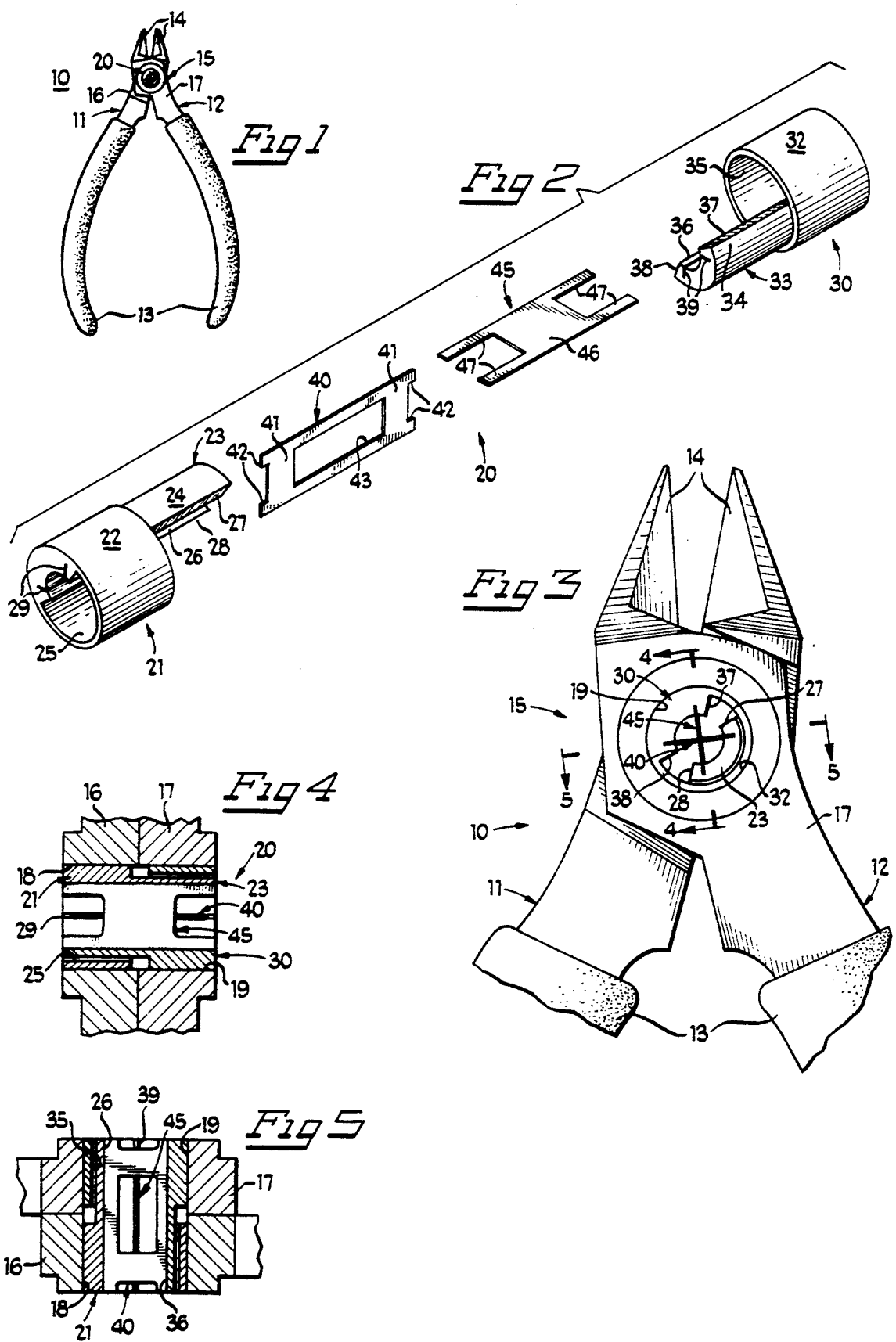

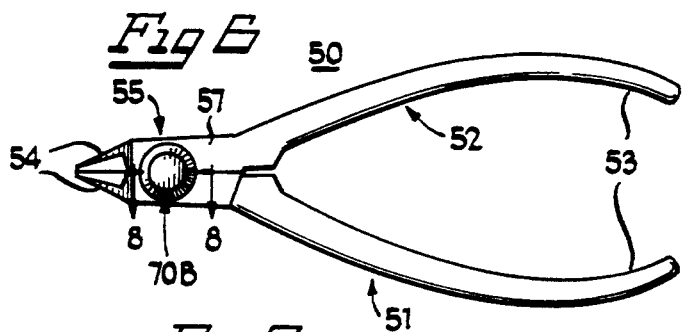
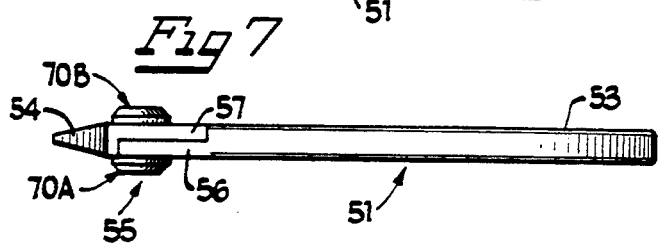
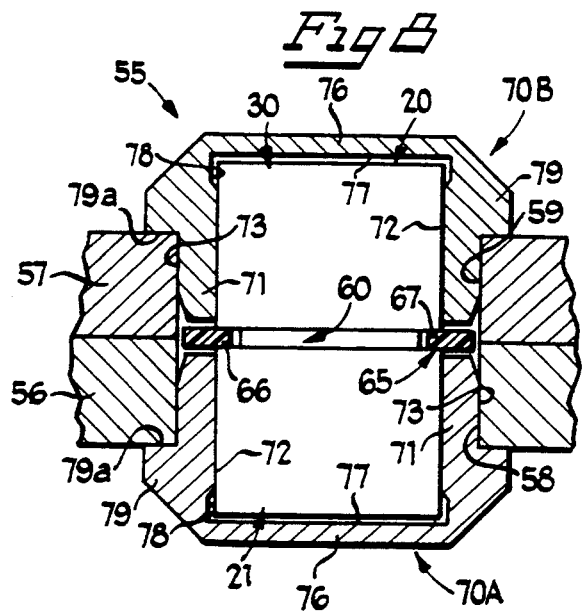
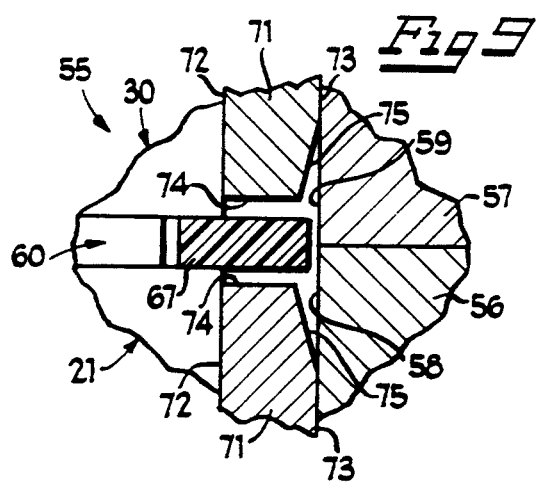
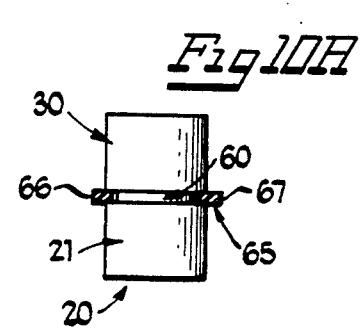
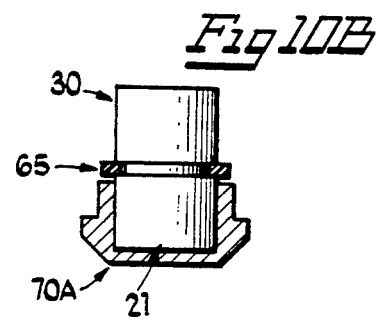
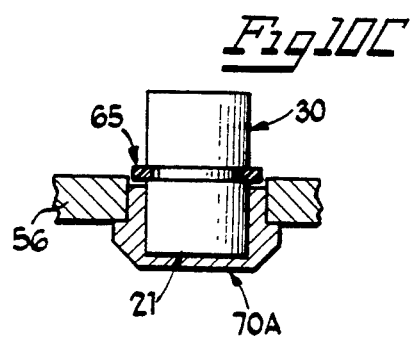
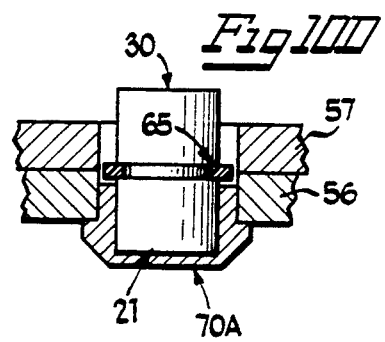
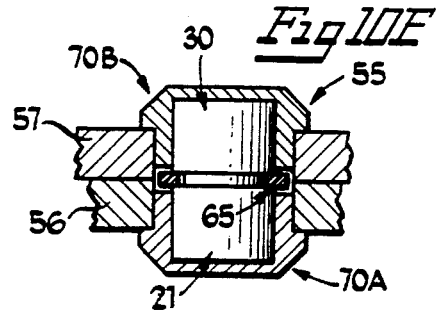

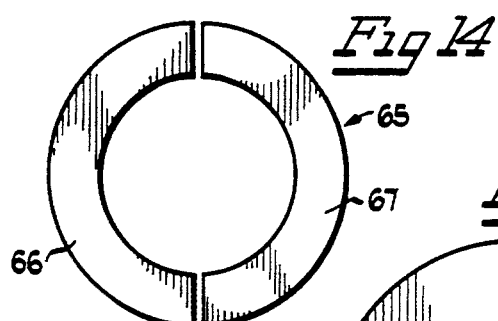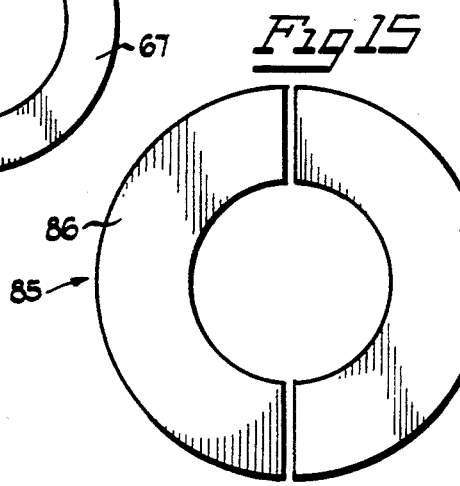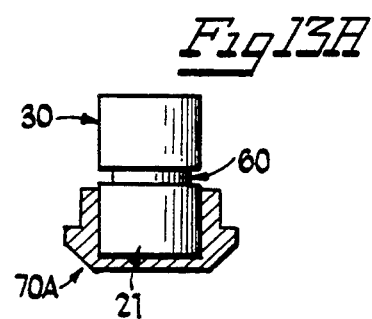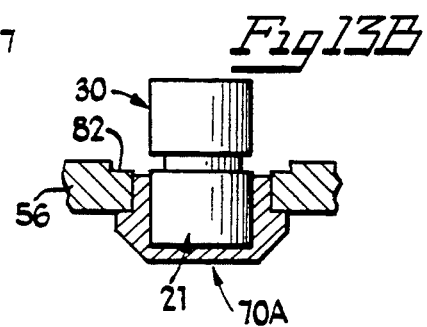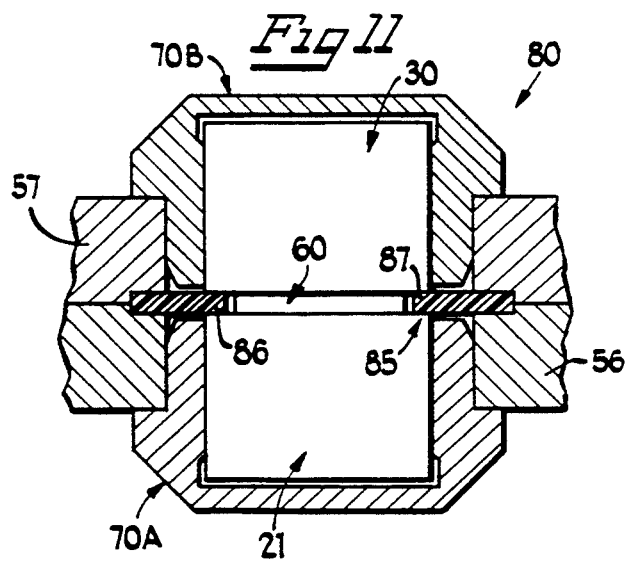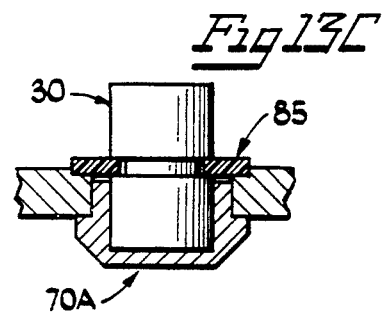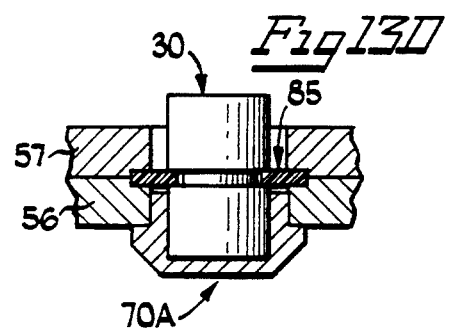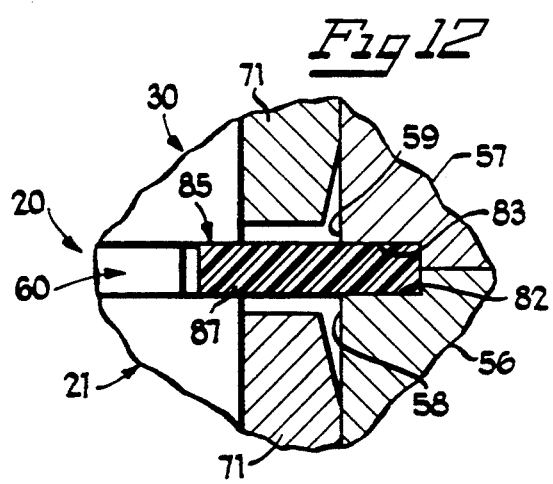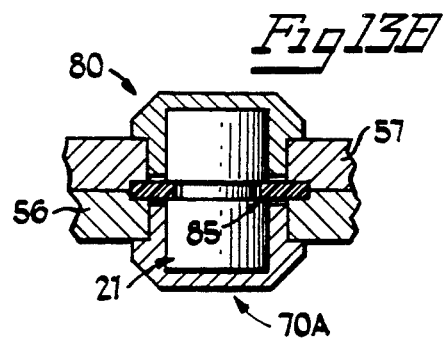

PIVOTAL HAND TOOL WITH FLEXURAL PIVOT JOINT AND METHOD OF ASSEMBLING SAME

CROSS-REFERENCE TO RELATED APPLICATION

This is a continuation-in-part of U.S. application Ser. No. 833,944, filed Feb. 10, 1992, and entitled "Pivotal Hand Tool with Flexural Pivot Joint", now abandoned.

BACKGROUND OF THE INVENTION

1. Field of the Invention

The present invention relates to pivotal hand tools, such as pliers, cutters and the like and, in particular, to pivot joints for such tools.

2. Description of the Prior Art

There are many types of pivotal hand tools, such as various types of pliers and cutters, and they all typically include a pair of lever members each having a handle portion at one end and a jaw portion at the other end and arranged in intersecting relationship for pivotal movement about a pivot axis through a point of interconnection so that the jaw portions cooperate with each other. Various types of pivot joints are provided for such hand tools. A common type of joint includes arranging the lever members in overlapping relationship with aligned openings therethrough and a pivot post extending through the aligned openings. The post may be in the form of a rivet, interlocking threaded fasteners and the like. In such pivot joints, the lever members are moveable relative to one or more parts of the pivot joint, causing frictional wear which results in loosening of the joint and difficulty in maintaining control and tolerances. In order to minimize such wear, it is frequently necessary to lubricate such prior pivot joints.

Furthermore, in pivotal hand tools such as cutters and the like, it is necessary that the jaws and handles be normally biased to an open condition, which necessitates the use of separate bias means. This adds to the complexity and expense of manufacture and assembly of the tool.

It is known to use flexural pivot assemblies in certain types of pivotal devices. Such pivot assemblies include a pair of cylindrical members and two thin flexural leaf spring elements disposed in crossed but non-contacting relationship in the cylindrical members, with each spring element having edge portions respectively fixed to the cylindrical members. The spring elements have very low column strength and are easily subject to damage during mounting of the flexural pivot assembly in associated bodies which are to be pivotally movable with respect to each other.

SUMMARY OF THE INVENTION

It is a general object of the present invention to provide an improved pivotal hand tool and pivot joint therefor which avoid the disadvantages of prior constructions while affording additional structural and operating advantages.

An important feature of the invention is the provision of a pivotal hand tool which has a pivot joint which undergoes no frictional wear in use.

Another feature of the invention is the provision of a pivotal hand tool of the type set forth, which requires no lubrication of the pivot joint.

Yet another feature of the invention is the provision of a pivotal hand tool of the type set forth which includes a pivot joint which automatically biases the tool to a neutral configuration without the use of separate biasing means.

A still further feature of the invention is the provision of a pivotal hand tool of the type set forth which includes a flexural pivot assembly and protects against axial compression of the pivot assembly.

Yet another feature of the invention is the provision of a pivotal hand tool of the type set forth which is of simple and economical construction.

A still further feature of the invention if the provision of a method of assembling a pivotal hand tool of the type set forth.

These and other features of the invention are attained by providing a pivotal hand tool comprising: first and second lever members respectively having cooperating jaws at adjacent ends thereof, the lever members being disposed in intersecting relationship and respectively having arcuate openings therein aligned along a common axis, first and second cylindrical members respectively coaxially disposed in the openings in axially spaced-apart relationship and respectively fixedly secured to the first and second lever members for movement therewith, spacer means disposed between the first and second cylindrical members for preventing axial movement thereof toward each other, and first and second thin flexural leaf spring elements disposed in crossed but non-contacting relationship within the cylindrical members, each of the flexural elements having edge portions respectively fixedly secured to the first and second cylindrical members for interconnecting same.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a top plan view of a pivotal hand tool which has a pivot joint incorporating a flexural pivot assembly in accordance with one embodiment of the present invention;

FIG. 2 is an enlarged, perspective, exploded view of the flexural pivot assembly of the hand tool of FIG. 1;

FIG. 3 is an enlarged, fragmentary, top plan view of the pivot joint region of the hand tool of FIG. 1;

FIG. 4 is a fragmentary view in vertical section taken along the line 4—4 in FIG. 3;

FIG. 5 is a fragmentary view in vertical section taken along the line 5—5 in FIG. 3;

FIG. 6 is a top plan view of a pivotal hand tool incorporating a flexural pivot assembly in accordance with another embodiment of the present invention;

FIG. 7 is a side elevational view of the hand tool of FIG. 6;

FIG. 8 is an enlarged, fragmentary view in vertical section taken along the line 8—8 in FIG. 6;

FIG. 9 is a further enlarged fragmentary view of a portion of the pivot assembly of FIG. 8;

FIGS. 10A–10E are diagrammatic views, respectively indicating steps in the assembly of the hand tool of FIG. 6;

FIG. 11 is a view similar to FIG. 8, illustrating another embodiment of the pivot joint of the hand tool of the present invention;

FIG. 12 is view similar to FIG. 9, illustrating the pivot joint of FIG. 11;

FIGS. 13A–13E are diagrammatic views, respectively indicating steps in the assembly of the pivot joint of FIG. 11;

FIG. 14 is a view of the spacers of the pivot joint of FIGS. 8 and 9; and

FIG. 15 is a plan view of the spacer of the pivot joint of FIGS. 11 and 12.

DESCRIPTION OF THE PREFERRED EMBODIMENTS

Referring to FIGS. 1 and 3, there is illustrated a pivotal hand tool 10, in the form of a cutter, constructed in accordance with and embodying the features of the present invention. The hand tool 10 includes a pair of lever members 11 and 12, each having a handle 13 at one end thereof and a jaw 14 at the other end thereof. The lever members 11 and 12 are interconnected at a pivot joint 15 and, more particularly, they are respectively provided with reduced-thickness pivot necks 16 and 17 intermediate the handles 13 and the jaws 14. Referring also to FIGS. 4 and 5, the pivot necks 16 and 17, respectively, have arcuate openings 18 and 19 therein. In the preferred embodiment, the openings 18 and 19 are in the form of cylindrical bores extending through the pivot necks 16 and 17, but it will be appreciated that they could be in the form of part-cylindrical recesses in the sides of the necks 16 and 17. In use, the pivot necks 16 and 17 are disposed in overlapping relationship with the openings 18 and 19 disposed in coaxial alignment.

Referring now also to FIG. 2, the pivot joint 15 includes a flexural pivot assembly 20 which interconnects the lever members 11 and 12. The flexural pivot assembly 20 includes substantially identical cylindrical sleeve members 21 and 30 which are, respectively, disposed in the openings 18 and 19 in the pivot necks 16 and 17. The sleeve member 21 has an outer cylindrical surface 22 and a part-cylindrical portion 23 which projects from one end thereof and has an outer surface 24 of a smaller diameter than the surface 22. The sleeve member 21 has a large diameter inner part-cylindrical surface 25 which has a diameter slightly larger than that of the outer surface 24 of the part-cylindrical portion 23 and extends along a predetermined arc, which is preferably slightly greater than 180°. Extending along the remaining arcuate portion of the sleeve member 21 is a small diameter part-cylindrical inner surface 26, which also extends the length of the part-cylindrical portion 23. The inner part-cylindrical surfaces 25 and 26 are interconnected by radial surfaces 27 and 28. Formed in the inner surface 26 are radial slots 29 which are angularly spaced apart approximately 90°. Each slot 29 extends axially the length of the member 21 and extends radially to an outer end spaced from the outer surface 22.

The cylindrical sleeve member 30 has an outer cylindrical surface 32 and a part-cylindrical portion 33 which projects from one end thereof and has an outer surface 34 of a smaller diameter than the surface 32. The sleeve member 31 has a large diameter inner part-cylindrical surface 35 which has a diameter slightly larger than that of the outer surface 34 of the part-cylindrical portion 33 and extends along a predetermined arc, which is preferably slightly greater than 180°. Extending along the remaining arcuate portion of the sleeve member 30 is a small diameter part-cylindrical inner surface 36, which also extends the length of the part-cylindrical portion 33. The inner part-cylindrical surfaces 35 and 36 are interconnected by radial surfaces 37 and 38. Formed in the inner surface 36 are radial slots 39 which are angularly spaced apart approximately 90°. Each slot 39 extends axially the length of the member 31 and extends radially to an outer end spaced from the outer surface 32.

The flexural pivot assembly 20 also includes two flexural leaf spring elements 40 and 45, each in the form of a thin sheet of spring metal and respectively disposed in perpendicular planes. The spring element 40 has a substantially rectangular body 41 provided at each end thereof with a pair of longitudinally outwardly extending stub arms 42 and provided centrally thereof with a rectangular aperture 43 therethrough. The spring element 45 has a generally rectangular body 46 provided at each end thereof with a pair of longitudinally and outwardly extending arms 47.

Preferably, the flexural pivot assembly is preassembled with the body 46 of the spring element 46 extending through the aperture 43 of the spring element 40. Each of the spring elements 40 and 45 has the longitudinal edges thereof respectively disposed in a slot 29 of the cylindrical sleeve member 21 and a slot 39 of the cylindrical sleeve member 30, and the part-cylindrical portions 23 and 33 are respectively telescopically and coaxially received within the large diameter inner surfaces 25 and 35 of the cylindrical sleeve members 21 and 30. The leaf spring elements 40 and 45 are preferably fixedly secured, as by brazing, in the slots 29 and 39 so as to interconnect the cylindrical sleeve members 21 and 30 in an assembled configuration, as illustrated in FIGS. 4 and 5. In this configuration, the leaf spring elements 40 and 45 are disposed in a cruciform arrangement and out of contact with each other, as can best be seen in FIGS. 3–5, and they serve to fix the cylindrical sleeve members 21 and 30 against axial movement relative to each other. They also serve to resiliently bias the cylindrical sleeve members 21 and 30 to a neutral pivotal configuration, illustrated in FIG. 3, wherein the radial surfaces 27 and 28 are respectively spaced from the radial surfaces 37 and 38, while accommodating pivotal movement of the cylindrical sleeve members 21 and 30 about their longitudinal axis away from the neutral configuration, this pivotal movement in the closing direction being limited by engagement of jaws 14 with each other.

Preferably, the outer cylindrical surfaces 22 and 32 of the flexural pivot assembly 20 have substantially the same diameter as the openings 18 and 19 in the necks 16 and 17 so that they can be respectively press-fitted in those openings, fixedly to secure the cylindrical sleeve members 21 and 30, respectively, to the lever members 11 and 12 for movement therewith. In assembly, the flexural pivot assembly 20 is so oriented with respect to the lever members 11 and 12 that, when the flexural pivot assembly 20 is in its neutral configuration, it biases the handles 13 and the jaws 14 to an open condition, illustrated in FIGS. 1 and 3. The spacing between the radial surfaces 27 and 37 in this neutral configuration is sufficiently large to permit movement of the jaws 14 to a fully closed position.

It will be appreciated that the pivot joint 15 has no parts which move in contact with each other, thereby eliminating frictional wear. This also eliminates the need for lubrication. Also, because of the inherent resilient flexibility of the flexural pivot assembly 20, no separate bias means is necessary in order to hold the jaws 14 open. There results a pivotal hand tool of relatively simple and economical construction with a pivot joint which is not subject to wear or loosening in use.

The thin leaf spring elements 40 and 45 have very low column strength. Therefore, axial compressive forces on the flexural pivot assembly 20 may tend to permanently damage the leaf spring elements 40 and 45, destroying or impairing the effectiveness of the flexural pivot assembly 20. Damaging forces may be experienced during the press-fitting of the flexural pivot assembly 20 into the openings 18 and 19 in the lever members 11 and 13, unless great care is taken during the assembly process. In order to substantially eliminate the chance of damage during assembly, other embodiments of the present invention are provided.

Referring to FIGS. 6 and 7, there is illustrated a pivotal hand tool 50, which is similar to the pivotal hand tool 10, and includes a pair of lever members 51 and 52 each having a handle 53 at one end thereof and a jaw 54 at the other end thereof. The lever members 51 and 52 are interconnected at a pivot joint 55 and, more particularly, they are respectively provided with reduced-thickness pivot necks 56 and 57 intermediate the handles 53 and the jaws 54. Referring also to FIGS. 8 and 9, the pivot necks 56 and 57, respectively, have arcuate openings 58 and 59 therein. In the preferred embodiment, the openings 58 and 59 are in the form of cylindrical bores extending through pivot necks 56 and 57, but it will be appreciated that they could be in the form of part-cylindrical recesses in the sides of the necks 56 and 57. In use, the pivot necks 56 and 57 are disposed in overlapping relationship with the openings 58 and 59 disposed in coaxial alignment.

Referring also to FIG. 14, the pivot joint 55 includes the flexural pivot assembly 20 which was described above in connection with FIGS. 1–5, and which includes an annular gap 60 between the cylindrical sleeve members 21 and 30. The flexural pivot assembly 20 is disposed coaxially in the aligned openings 58 and 59 in the lever members 51 and 52, which openings preferably have a diameter substantially greater than the outer diameter of the flexural pivot assembly 20.

The pivot joint 55 also includes a spacer structure 65, which is generally annular in shape and is disposed between the cylindrical sleeve members 21 and 30. More specifically, the spacer structure 65 has a thickness which is substantially equal to the axial width of the gap 60 between the cylindrical sleeve members 21 and 30, so as to substantially completely occupy the gap 60, thereby effectively preventing axial movement of the cylindrical sleeve members 21 and 30 toward each other. Preferably, the spacer structure 65 has an inner radius slightly greater than that of the outer surfaces 24 and 34 of the part-cylindrical portions 23 and 33 of the flexural pivot assembly 20 and an outer radius slightly greater than the radius of the cylindrical sleeve members 21 and 30, but less than the radius of the openings 58 and 59 in the lever members 51 and 52.

The spacer structure 65 is preferably formed as a split washer to permit assembly around the flexural pivot assembly 20 and, in the preferred embodiment, comprises a pair of substantially semi-annular or half-washer members 66 and 67 which cooperate to define a substantially annular structure. This configuration permits the spacer structure 65 to be fitted in the gap 60 between the cylindrical sleeve members 21 and 30 without exerting any axial force thereon. The spacer structure 65 may be formed of any suitable material, but is preferably formed of a material having a very low coefficient of friction, such as that sold under the trademark "TEFLON".

The pivot joint 55 also includes a pair of generally cup-shaped mounting members in the form of bushings, respectively designated 70A and 70B, which are of identical construction, so that the same reference numerals will be applied to the parts of each. Each of the bushings 70A and 70B has a cylindrical side wall 71 with a cylindrical inner surface 72 having a diameter substantially the same as that of the sleeve members 21 and 30 of the flexural pivot assembly 20, and an outer cylindrical surfaces 73 having a diameter substantially the same as that of the lever member openings 58 and 59. The side wall 71 terminates in an annular end surface 74, the outer cylindrical surface 73 being beveled or chamfered, as at 75, toward the end surface 74. The side wall 71 is closed at its other end by a circular end wall 76 having an inner surface 77, the inner cylindrical surface 72 of the side wall 71 being recessed, as at 78, adjacent to the end wall 76. The side wall 71 is provided adjacent to the end wall 76 with a radially outwardly extending annular flange 79 defining an annular shoulder 79a.

The cylindrical side walls 71 of the bushings 70A and 70B are dimensioned to be fitted in the openings 58 and 59, in the pivot necks 56 and 57 and over the cylindrical sleeve members 21 and 30, respectively, in press-fitted engagement with each. It will be appreciated that the chamfers 75 facilitate insertion of the side walls 71 in the openings 58 and 59. The shoulders 79a are, respectively, engageable with the outer surfaces of the pivot necks 56 and 57 to limit the depth of insertion of the bushings 70A and 70B, the parts being so dimensioned that when thus fully inserted, the end walls 76 are, respectively, preferably spaced a slight distance from the end walls of the cylindrical sleeve members 21 and 30. Thus, it will be appreciated that the bushings 70A and 70B form caps completely enclosing and concealing the flexural pivot assembly 20. The spacer structure 65 effectively prevents axial movement of the cylindrical sleeve members 21 and 30 of the flexural pivot assembly 20 toward each other in response to the forces exerted thereon when the bushings 70A and 70B are press-fitted into place. Because the spacer structure 65 is preferably formed of a material having a very low coefficient to friction, it does not significantly resist the torsional movements of the flexural pivot assembly 20.

Referring now to FIGS. 10A–10E, the assembly of the pivot joint 55 will be explained. Initially, the spacer 65 is fitted in the gap 60 in the flexural pivot assembly 20, as illustrated in FIG. 10A. In this regard, the washer halves 66 and 67 are, respectively, moved radially inwardly into place in the gap 60. It will be appreciated that the spacer structure 65 could also be formed in a unitary one-piece construction in the nature of a single-split ring, but such a construction would be more difficult to apply to the flexural pivot assembly 20 and might exert axial stresses thereon during assembly.

The bushing 70A is then press-fitted over the cylindrical sleeve member 21, as illustrated in FIG. 10B. The presence of the spacer structure 65 in the gap 60 prevents any relative axial movement of the cylindrical sleeve members 21 and 30 toward each other during the mounting of the bushing 70A.

Next, the flexural pivot assembly 20 is fixed to the lever member 51 by inserting the cylindrical sleeve member 30 through the opening 18 from the outside to the inside thereof, press-fitting the bushing 70A in the opening 58 until the flange 79 engages the outer surface of the pivot neck 56, as illustrated in 10C. The other lever member 52 is fitted over the cylindrical sleeve member 30 until it abuts the lever member 51, as illustrated in FIG. 10D. Finally, the bushing 70B is press-fitted over the cylindrical sleeve member 30 and into the lever member opening 59, as illustrated in FIG. 10E to complete the assembly.

Referring now to FIGS. 11 and 12, there is illustrated a modified pivot joint 80, which is substantially the same as the pivot joint 55 of FIGS. 8 and 9, except that in this case the inner faces of the pivot necks 56 and 57 are, respectively, provided with annular recesses 82 and 83 (FIG. 12) adjacent to the openings 58 and 59. Referring also to FIG. 15, the pivot joint 80 includes a spacer structure 85, which may include washer halves 86 and 87 and be substantially the same as the spacer structure 65, except that it has a larger outer diameter. More specifically, the outer diameter of the spacer structure 85 is substantially greater than the diameter of the openings 58 and 59, so that the spacer structure 85 extends between the pivot necks 56 and 57, being seated in the recesses 82 and 83. Thus, the spacer structure 85 will serve as a low-friction bearing between the lever members 51 and 52.

Referring to FIGS. 13A–13E, in assembly of the pivot joint 80, the bushing 70A is first press-fitted over the cylindrical sleeve member 21 and is then press-fitted in the opening 58 in the pivot neck 56 of the lever member 51, as illustrated in FIGS. 13A and 13B. During these first two assembly steps, relative axial compressive forces between the cylindrical sleeve members 21 and 30 may be avoided by gripping only the cylindrical sleeve member 21.

Next, the spacer structure 85 is fitted in place in the gap 60 in the flexural pivot assembly 20, and is seated in the pivot neck recess 82, as illustrated in FIG. 13C. The other lever member 52 is then applied over the flexural pivot assembly 20, with its recess 83 seating against the spacer structure 85, as illustrated in FIG. 13D. Finally, as is shown in FIG. 13E, the other bushing 70B is press-fitted into place, relative axial movement of the cylindrical sleeve members 21 and 30 being prevented by the spacer structure 85.

The greatest risk of damage to the flexural pivot assembly 20 is in the assembly step of FIG. 13A. In order to eliminate this risk, the spacer structure 85 could first be inserted in the gap 60 before the step of FIG. 13A, and then removed to permit the assembly step of FIG. 13B, with the remainder of the assembly steps proceeding as described above in connection with FIGS. 13C–13E.

From the foregoing, it can be seen that there has been provided an improved pivotal hand tool and an improved low-friction, low-maintenance pivot joint therefor of simple and economical construction, along with an improved method of assembly thereof, which substantially eliminates the chance of damage to the flexural pivot assembly.

I claim:

1. A pivotal hand tool comprising: first and second lever members respectively having cooperating jaws at adjacent ends thereof, said lever members being disposed in intersecting relationship and respectively having arcuate openings therein aligned along a common axis, first and second cylindrical members respectively coaxially disposed in said openings in axially spaced-apart relationship and respectively fixedly secured to said first and second lever members for movement therewith, spacer means formed of a material having a very low coefficient of friction discrete from said first and second cylindrical members and disposed therebetween for preventing axial movement thereof toward each other, and first and second thin flexural leaf spring elements disposed in crossed but non-contacting relationship within said cylindrical members, each of said flexural elements being spaced from said spacer means and having edge portions respectively fixedly secured to said first and second cylindrical members for interconnecting same, said spacer means serving to absorb axial compressive forces applied to said cylindrical members and to minimize transmission thereof to said leaf spring elements.

2. The hand tool of claim 1, wherein said spacer means comprises a split annular member.

3. The hand tool of claim 2, wherein said spacer means comprises a pair of substantially semi-annular members cooperating to define a substantially annular configuration coaxial with said cylindrical members.

4. The hand tool of claim 1, wherein said spacer means extends between said lever members in engagement with each.

5. The hand tool of claim 4, wherein said lever members have recesses formed in the facing surfaces thereof for accommodating said spacer means.

6. The hand tool of claim 1, and further comprising mounting means disposed in said openings between said cylindrical members and said lever members in press-fitted engagement with each.

7. A pivotal hand tool comprising: first and second lever members respectively having cooperating jaws at adjacent ends thereof, said lever members being disposed in intersecting relationship and respectively having arcuate openings therein aligned along a common axis, first and second cylindrical members respectively coaxially disposed in said openings in axially spaced-apart relationship and respectively fixedly secured to said first and second lever members for movement therewith, a first mounting member discrete from said first cylindrical member and disposed in said opening of said first lever member between said first lever member and said first cylindrical member and fixed to each, a second mounting member discrete from said second cylindrical member and disposed in said opening of said second lever member between said second lever member and said second cylindrical member and fixed to each, and first and second thin flexural leaf spring elements disposed in crossed but non-contacting relationship within said cylindrical members, each of said flexural elements having edge portions respectively fixedly secured to said first and second cylindrical members for interconnecting same.

8. The hand tool of claim 7, wherein each of said first and second mounting members is disposed in press-fitted engagement with the associated ones of said lever members and said cylindrical members.

9. The hand tool of claim 7, wherein each of said mounting members has a radially outwardly extending flange disposable in engagement with the outer surface of the associated one of said lever members to limit the depth of insertion in said openings.

10. The hand tool of claim 7, wherein each of said mounting members is generally cup-shaped and covers the adjacent one of said cylindrical members in use.

11. The hand tool of claim 7, and further comprising spacer means disposed between said first and second cylindrical members for preventing axial movement thereof toward each other.

12. The hand tool of claim 11, wherein said spacer means includes a split annular member.

13. The hand tool of claim 11, wherein said spacer means is formed of a material having a very low coefficient of friction and extends between said lever members in engagement with each.

14. A method of assembling a pivotal hand tool having first and second lever members respectively having arcuate openings therein and interconnected by a flexural pivot assembly including flexural leaf spring elements each fixed to first and second coaxial and axially spaced-apart cylindrical members, said method comprising the steps of: placing a spacer formed of a material having a very low coefficient of friction between the cylindrical members and spaced from the leaf spring elements without exerting substantial axial forces on the cylindrical members thereby to prevent axial movement of the cylindrical members toward each other, disposing the first cylindrical member coaxially in the opening in the first lever member and fixing it to the first lever member, and disposing the second cylindrical member coaxially in the opening of the second lever member and fixing it to the second lever member, whereby the spacer absorbs axial compressive forces applied to the cylindrical members and minimizes transmission thereof to the leaf spring elements, 15. The method of claim 14, wherein the step of placing the spacer includes placing it so that it is disposed between the lever members in contact with each.

16. The method of claim 15, and further comprising providing the spacer formed of a material having a very low coefficient of friction.

17. The method of claim 15, and further comprising the steps of press-fitting a first mounting member in the opening in the first lever member between the first lever member and the first cylindrical member, and press-fitting a second sleeve in the opening in the second lever member between the second 1 ever member and the second cylindrical member.

18. The method of claim 18, wherein the first mounting member is press-fitted around the first cylindrical member after the spacer is disposed between the cylindrical members, then the first mounting member is press-fitted in the opening of the first lever member, then the second cylindrical member is disposed in the opening of the second lever member, then the second mounting member is press-fitted in the opening of the second lever member between the second lever member and the second cylindrical member.

19. The method of claim 17, wherein the first mounting member is first press-fitted around the first cylindrical member, then the first mounting member is press-fitted in the opening of the first lever member, then the spacer is placed between the cylindrical members and is provided in a size so that it extends laterally beyond the opening in the first lever member and overlaps the first lever member, then the second cylindrical member is disposed in the opening of the second lever member until the second lever member engages the spacer, and then the second mounting member is press-fitted in the opening of the second lever member between the second lever member and the second cylindrical member.

* * * * *

UNITED STATES PATENT AND TRADEMARK OFFICE
CERTIFICATE OF CORRECTION

PATENT NO. : 5,335,418

DATED : August 9, 1994

INVENTOR(S) : Bert Krivec

It is certified that error appears in the above-identified patent and that said Letters Patent is hereby corrected as shown below:

Column 10, line 9, "15" should be --14--;

line 16, "18" should be --17--.

Signed and Sealed this

Twenty-fifth Day of October, 1994

Attest:

BRUCE LEHMAN

*Attesting Officer*   *Commissioner of Patents and Trademarks*